Oct. 18, 1960 G. C. SUMMERS 2,956,635
ACOUSTIC PULSE FREQUENCY LOG
Filed March 14, 1955 2 Sheets-Sheet 2
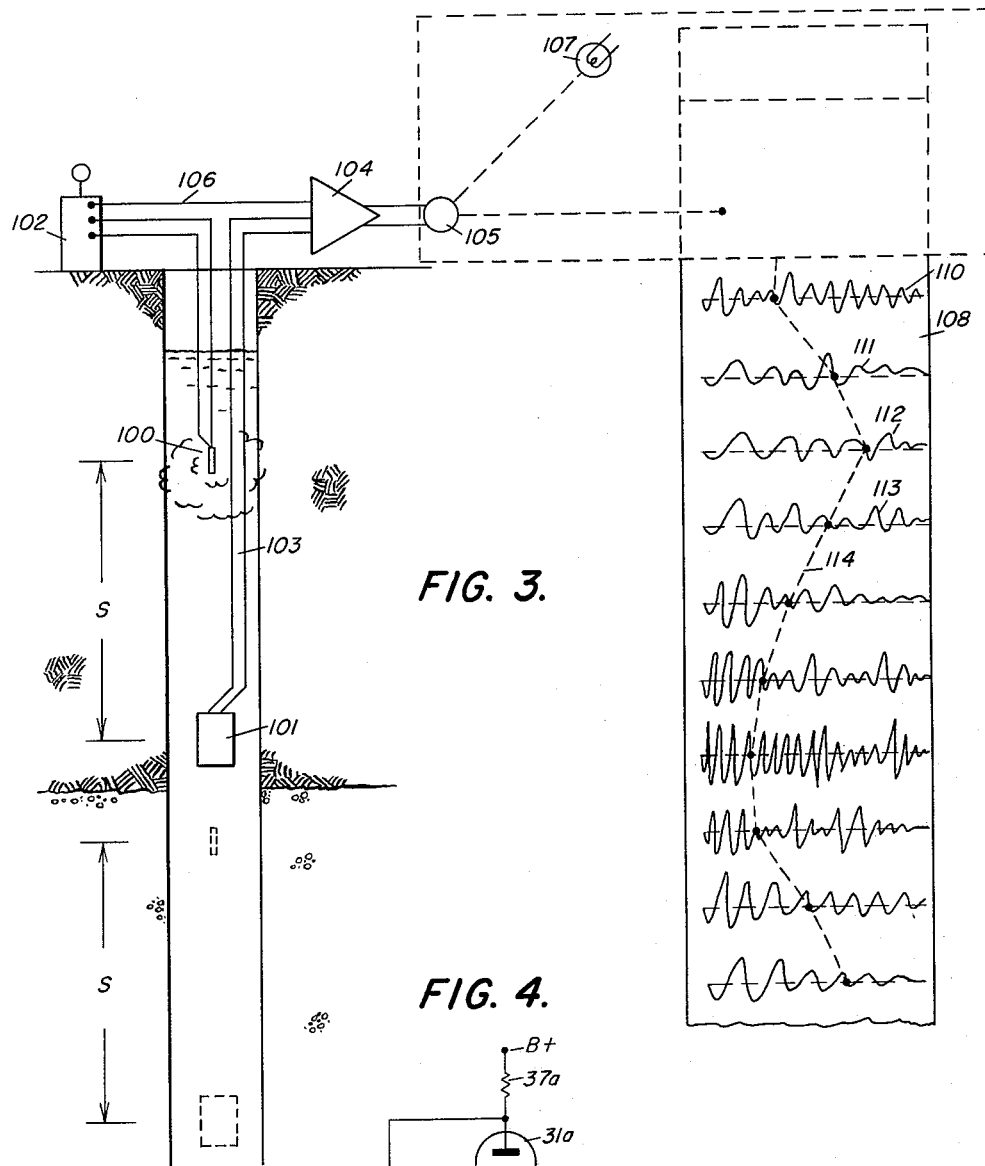
FIG. 3.
FIG. 4.
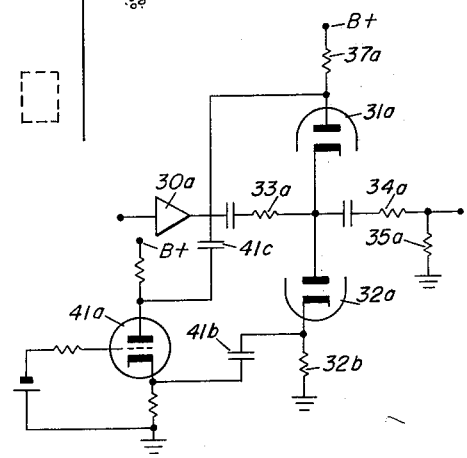
GERALD C. SUMMERS
INVENTOR.

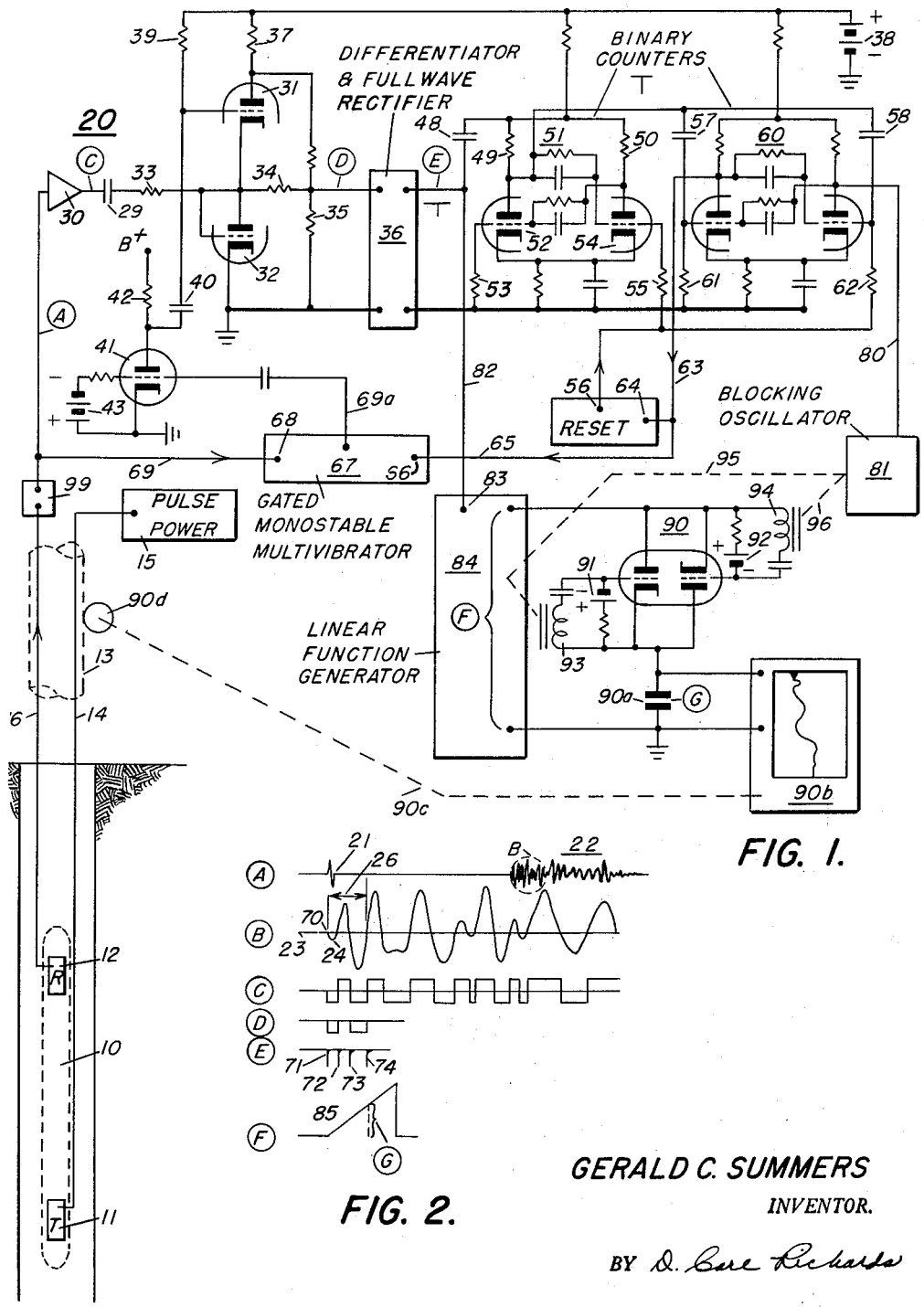

United States Patent Office 2,956,635
Patented Oct. 18, 1960

2,956,635

ACOUSTIC PULSE FREQUENCY LOG

Gerald C. Summers, Dallas, Tex., assignor, by mesne assignments, to Socony Mobil Oil Company, Inc., a corporation of New York Filed Mar. 14, 1955, Ser. No. 493,944

1 Claim. (Cl. 181—.5)

This invention relates to acoustic well logging and more particularly to methods for producing a log dependent upon frequency selective modification of acoustic energy traveling through earth formations.

It has been found that the frequency of an acoustic signal resulting from generation of transient acoustic pulses is somewhat dependent upon the character of the surrounding formations. For example in acoustic well logging systems employing a transmitter and a receiver spaced about ten borehole diameters, more or less, along a borehole, the resonant properties of the transmitter and its driving system under different load conditions contribute to production of signals of different predominant frequencies. It is also possible that the attenuation of such signals in travel from the transmitter to the adjacent borehole walls and thence through the formations to the receiver undergo frequency selective modification. Such a system moved along the length of a borehole and past formations highly contrasting in character one with another would produce modifications in the frequency spectrum of the received pulse that may be correlated with the lithology.

In accordance with the present invention there is provided a method of logging earth formations penetrated by a borehole which includes producing a succession of sound fields separated in time one from another and each characterized by having an abrupt onset of sound oscillations. At each of a plurality of points in a borehole extending through the earth formations at least one of the sound fields is detected. A measurement is then made of the time interval in each of the sound fields corresponding with a predetermined number of acoustic oscillations thereof beginning with the abrupt onset. The magnitude of the time intervals is then registered on a space scale related to the depth of the detecting point. Variations in frequency of the detected sound fields when plotted on a depth scale indicate contrasting formation characteristics. The time interval may be measured by several different methods involving the generation of a condition which changes in magnitude in a known manner beginning in response to the detection of the abrupt onset of each sound field.

This invention is particularly concerned with the method of generating a succession of time-separated oscillatory sound fields each having an abrupt onset. The oscillatory sound fields are detected at a plurality of points in a borehole. These are registered on a space scale related to the depths of the points in the borehole and represent magnitudes of conditions each proportional to the frequency of the oscillating sound fields respectively detected at the spaced points.

For a further understanding of the present invention and for a more complete description thereof, reference may now be had to the following description taken in conjunction with the accompanying drawings in which:

Fig. 1 is a schematic diagram of the present invention;

Fig. 2 includes a plot of voltages generated in the system of Fig. 1;

Fig. 3 illustrates a modification of the invention; and

Fig. 4 illustrates a modified gating unit.

The present invention will first be described in terms of the methods carried out by the system and apparatus illustrated in Fig. 1 and described in connection with the functions illustrated in Fig. 2. This system and apparatus are disclosed and claimed in copending application of Joseph Zemanek, Jr., et al., coworkers of applicant, Serial No. 493,896, filed March 14, 1955, for "System for Acoustic Pulse Frequency Logging."

Referring now to the system of Fig. 1, there is shown an exploring unit 10 having a transmitter 11 at the lower end thereof and a receiver 12 near the upper end thereof. The unit 10 is supported as by cable means 13 which may include a first channel 14 connected to a pulse power source 15 for transmitter 11. A second channel 16 is connected to a measuring system 20. Pulse power applied from source 15 to transmitter 11 repeatedly energizes transmitter 11 to produce sharp, time-spaced acoustic pulses.

Acoustic energy from transmitter 11 travels to receiver 12 by way of the adjacent formations as well as through the fluid in the borehole. However, since formations generally have a higher acoustic velocity than fluids, the acoustic energy first reaching receiver 12 will have traveled through the formations and thus may be treated to yield data singularly dependent upon acoustic properties of the formations.

In graph A, Fig. 2, the received energy has been illustrated as comprising a rather complex train of waves which represents the sum of the waves traveling by all paths from the transmitter 11 to the receiver 12. A timing marker or initial pulse 21 is applied to channel 16 coincident with the generation of the acoustic pulse by transmitter 11. Thus pulse 21 may be employed for control purposes as will hereinafter be explained.

The principal interest in connection with the present invention centers upon the first few cycles of the received pulse 22 such as appear in the dotted circle B and which are represented in a magnified form in graph B of Fig. 12. The received energy, graph B, builds up to fairly large oscillations with reference to a zero axis 23. Depending upon the manner of connecting the receiver 12 to the measuring circuit 20, the first excursion from the zero axis may be positive or negative and has been shown as a negative excursion 24 followed by succeeding cycles of greater amplitude and of frequency which depends upon the loading of the transmitter 11 by the borehole fluids and the adjacent formations, the character of the excitation and of the attenuating properties intermediate transmitter 11 and receiver 12. It has been found that the frequency of such signals is determined at least in part by the character of the formations. This invention therefore relates to a measurement proportional to the average frequency of the first few cycles of the received pulse 22. In the system shown in Fig. 1 the time interval 26 equal to the sum of the periods of the first three excursions of wave 22 is measured.

The signal 22 from the receiver 12 is applied by way of channel 16 to an amplifier and clipper 30 which applies at its output a square wave of the type illustrated by graph C. Amplifier 30 may be of a type well known by those skilled in the art in which high amplification produces steep slopes at or adjacent the zero axis. The resultant signals, when clipped, have square wave configuration. The square waves of form C are then applied by way of condenser 29 to the input of a signal gate. Preferably condenser 29 is large and has a low duty cycle so that the charge thereon does not change materially during any cycle of operations. The signal gate connected to condenser 29 includes a triode 31 and a triode 32 connected as a diode. More particularly, the gate circuit includes a piar of series resistors 33 and 34 and an output resistance 35. The juncture between resistors 34 and 35 is connected to unit 36 and the lower end of output resistor 35 is connected to ground.

The triode 32 is connected at its cathode to ground and at its anode to the juncture between resistors 33 and 34 and to the cathode of tube 31. The anode of tube 31 is connected by way of resistor 37 to the positive terminal of a suitable B+ supply source which, for the purpose of illustration, has been shown as a battery 38. The grid of tube 31 is connected by way of resistor 39 to the positive terminal of battery 38, and by way of condenser 40, to the anode of a control tube 41. Tube 41 is connected at its anode by way of resistor 42 to a B+ terminal and at its cathode to ground and is biased by battery 43 connected in the grid circuit thereof as to be normally non-conducting. When this is the case, the bias on the grid of tube 31 permits tube 31 to conduct at a relatively high current level, the current thereupon flowing through tube 32 to ground. The large current flow is such as to prevent the signal from amplifier 30 from producing any appreciable voltage changes across the output impedance 35.

When tube 41 is permitted to conduct, the anode thereof is at a lower voltage than when cut off. The circuit is designed so that the anode voltage is sufficiently low that triode 31 is cut off and no current flows therein. When this is the case, the negative portions of the waveform C, Fig. 2, appear across the output resistor 35, the positive portions being shunted by the diode 32.

A signal passing to unit 36 is represented by the waveform D, Fig. 2. Positive excursions of waveform C have been clipped, leaving only negative components. Unit 36 includes a differentiator and a full-wave rectifier which may be of conventional design to produce at the output a series of negative voltage spikes or pulses which occur in time coincident with the passage through the zero axis 23 of the waveform shown in graph B. Such negative pulses have been shown in graph E and are applied by way of condenser 48 and resistors 49 and 50 to the anodes of a first decade counter unit 51. Since the construction and operation of binary counters are well known, the circuit will not be described in detail. Briefly, however, the grid of the first triode stage 52 is connected by way of impedance 53 to ground and the grid of the second triode, stage 54, is connected by way of impedance 55 to the output terminal 56 of a reset unit. The anode of the first tube 52 is connected by way of condensers 57 and 58 to the control grids of the second counter stage 60. Counter 60 is identical with counter 51, being connected at its input grid through impedance 61 to ground and the grid of the output stage to terminal 56 of the reset unit by way of impedance 62. The anode of the input stage of counter 60 is connected by way of conductor 63 to the input terminal 64 of the reset unit and by way of conductor 65 to the input terminal 66 of a gated monostable multivibrator 67. A second input 68 of multivibrator 67 is connected to channel 16 by way of conductor 69 and the output of multivibrator 67 is connected by way of conductor 69a to the input grid of the gate control tube 41.

The system thus far described operates in the following manner. At an instant corresponding with the beginning of the received pulse of graph B (at time 70) the voltage on channel 16 triggers monostable multivibrator 67 from its stable state to its unstable state to raise the voltage on the grid of tube 41, permitting it to conduct thereby abruptly lowering the voltage on the grid of tube 31. This action renders tube 31 non-conductive, permitting signals to pass through the gate circuit which includes tubes 31 and 32. The signal of graph B also is applied to amplifier 30 where it is squared and clipped to form at the output thereof a waveform as shown in graph C. The latter waveform passes through the gate where the positive excursions thereof are clipped and the negative excursions transmitted to the unit 36. Unit 36 differentiates and full-wave rectifies the applied signal to produce the negative spikes shown in graph E.

The first pulse 71 of graph E turns off the tube 52 which is normally conducting and fires tube 54. The second pulse 72 turns off tube 54 and re-establishes conduction in tube 52. At the same time a negative pulse is produced at the anode of the tube 52 which is applied by way of condenser 57 to the grid of the first tube of counter 60 to extinguish the first tube and to establish conduction in the second tube of counter 60. A third pulse 73 extinguishes tube 52 and initiates conduction in tube 54. A fourth pulse 74 extinguishes tube 54 initiating conduction in tube 52 and causes a negative pulse to be applied from the plate of tube 52 through the condenser 57 to the grid of the first stage of counter 60. This turns off the second stage of counter 60, producing a positive pulse at the anode of the second stage and a negative pulse at the anode of the first stage. The latter pulse is applied to the reset counter by way of conductor 63 to re-establish conduction in the first stages of counters 51 and 60 and also is applied by way of conductor 65 to the monostable multivibrator 67 abruptly to return the latter to its stable state. This action causes tube 41 to be cut off and re-establishes conduction through tube 31. The portions of the waveform B which occur following pulse 74 are then blocked and do not pass to the counter system.

It should be noted, however, that the output of unit 36 is coupled by way of conductor 82 to the control terminal 83 of a function generator 84. The first pulse 71 of graph E serves to initiate action in function generator 84. Preferably a function is produced in unit 84 which linearly increases in magnitude as a function of time following pulse 71. For the purpose of illustration it will be assumed that function generator 84 is of the type described and claimed in co-pending application Serial No. 192,750, filed October 28, 1950, of Gerald C. Summers, now Patent No. 2,704,364, which issued March 15, 1955, wherein a voltage of the form shown in graph F is produced and comprises a linearly increasing voltage which from a predetermined level at the instant of pulse 71 increases linearly over a time interval much greater than the time interval occupied by the selected number of cycles of the received pulse. The output of function generator 84 is coupled to a double triode clamp 90 connected in series with a capacitive element 90a. The double triode clamp is characterized by the anode of the first section connected to the cathode of the second section and the cathode of the first section connected to the anode of the second section. A battery 91 connected in the grid cathode circuit of the first stage maintains the first stage normally cut off. A battery 92 in the grid cathode circuit of the second stage maintains the second stage normally cut off. Transformer windings 93 and 94 in the grid cathode circuit of the first and second stages, respectively, is coupled by magnetic linkages represented by the dotted lines 95 and 96 to a blocking oscillator 81.

At an instant corresponding with pulse 74 a positive pulse appears at the anode of the second stage of counter 60 which is applied by way of conductor 80 to the blocking oscillator 81. A resultant pulse produced in a magnetic core in blocking oscillator 81 common to the windings 93 and 94 serves to momentarily permit conduction through the double triode clamp at the instant corresponding with pulse 74, graph E, to permit flow of an electrical charge between function generator 84 and condenser 90a. The action is such as to charge condenser 90a to a voltage equal to the magnitude of the function 85 at an instant corresponding with the occurrence of pulse 74. The latter voltage in graph F is represented by the symbol G. Thus the voltage G is directly proportional to the time interval 26, graph B. The voltage across condenser 90a is recorded on recorder 90b. The chart is driven by a mechanical coupling 90c from pulley 90d which is in contact with cable 13.

The system may be operated by moving the exploring unit 10 over the length of a well bore and repeating the series of operations above described at each of a plurality of depths to open the double triode clamp 90 in response to each received pulse and thereby adjust the charge on condenser 90a so that the latter charge is always directly proportional to the time interval of the selected number of excursions of the received pulse 22 from its zero axis.

It will be apparent that any selected number of excursions of the received pulse may be employed for measurement in accordance with the present invention. Three excursions (or four zero crossings) have been here employed for the purpose of illustration.

In general it will be preferred in the design of a suitable system to limit the time following the generation of each acoustic pulse in which the measurements are made in order to avoid the measurements influenced by energy passing through the borehole fluids. The time interval required for energy to reach the receiver via the borehole fluids may be computed by taking the ratio of the velocity of sound in the fluid to the distance between transmitter 11 and receiver 12.

It should further be understood that the function generator 84 may take forms other than those characterized by the generation of a linearly increasing voltage. For example, the system for generating a train of high frequency pulses such as disclosed in co-pending application Serial No. 370,376 of Robert A. Broding et al., co-workers of applicant, is suitable. As there disclosed, the limits of the time interval to be measured are defined by pulses 71, 74, graph E (the control pulses on conductors 82 and 80).

The foregoing description has assumed the idealized conditions insofar as noise is concerned. More particularly as shown in graph A, Fig. 2, the receiver channel 16 is free from any noise in the interval between the generation of each acoustic pulse by transmitter 11 corresponding with pulse 21 and the reception by receiver 12 of pulse 22. In practice it may be found that noise energy will set the system of Fig. 1 into operation to count the first few cycles of the noise energy. Such erroneous measurements may be avoided by employing the noise sensing system described and claimed in co-pending application Serial No. 482,993, filed January 20, 1955, now Patent No. 2,857,011, issued October 21, 1958, of Gerald C. Summers wherein a noise responsive unit 99 permits transmission of signals to the measuring circuit 20 only when noise in the interval between pulse 21 and received pulse 22 is below a certain predetermined level.

The method of the present invention may also be carried out by the system illustrated in Fig. 3. In this system, an explosive source such as a dynamite cap 100 is positioned a predetermined distance S from a detector 101. A blaster 102 serves to detonate the cap 100 to produce an explosive impulse which travels through the borehole fluids and through the adjacent formations to detector 101. Detector 101 is connected by way of signal channel 103 to an amplifier 104 whose output is applied to a galvanometer 105. A synchronizing channel 106 is connected between blaster 102 and amplifier 104 to permit control of the ultimate recording of signals from receiver 101. Light from a source 107 suitably focused on galvanometer 105 is reflected onto recording chart 108 and is adapted to record, as is well understood by those skilled in the art, the time variations of the signals from receiver 101. For the purpose of illustration, a plurality of such recordings are illustrated on the chart 108. The first transient 110 there recorded may represent the signal received by detector 101 at a relatively near surface formation. The traces 111, 112 and 113, etc. may be taken as representative of recordings secured by detonating a blasting cap a distance S from receiver 101 while receiver 101 is positioned at succeedingly deeper points in the borehole. By recording the waveform of the impulses thus detected, the excursions from the zero level may be readily observed and if desired, the points corresponding to like numbers of excursions may be connected as by dotted line 114.

This portrays graphically a function of the borehole formations and provides an index to the delineation thereof. The recordings on chart 108 may be taken as representative of the procedures automatically carried out through use of the system of Fig. 1.

Alternatively, each transient from receiver 101 may be displayed on a cathode ray oscilloscope and a photograph secured to record the transient. A log may then be produced by manually measuring the time interval on such photographs occupied by a selected number of cycles of each transient and plotting the time interval at the appropriate point on a depth related scale. Thus the method may be carried out completely automatically, as in Fig. 1, or partially by hand as in Fig. 3 or as above described, the log obtained being a function of the frequency of the received transient.

In Fig. 4 there is illustrated a gate which in some cases may be preferable to the gate shown in Fig. 1 which includes the tubes 31 and 32. In Fig. 4 the components having similar functions have been given the same reference characters as in Fig. 1 with the suffix "a" added.

The signal from amplifier 30a is applied to a pair of diodes 31a and 32a by way of resistor 33a. The anode of diode 31a is connected by way of resistor 37a to B+, and the cathode is connected to the anode of diode 32a. The cathode of diode 32a is connected to ground by way of resistor 32b. The cathode of tube 31a also is connected by way of resistor 34a to an output terminal with output impedance 35a connected to ground. Control triode 41a is connected at its cathode by way of condenser 41b to the cathode of tube 32a. The anode of tube 41a is connected by way of condenser 41c to the anode of diode 31a.

Operation of the gate is such that when tube 41a is conducting, diodes 31a and 32a have high impedance so that signals are transmitted through the gate and appear across output resistor 35a. When tube 41a is not conducting, the diodes have low impedance compared to resistors 33a and 34a and serve to shunt signals from amplifier 30a.

It will be noted that in Fig. 2 the waveform D is one-half the amplitude of waveform C. Use of the gate circuit of Fig. 4 will avoid the loss of signal amplitude and in this regard only does the gate including tubes 31 and 32, Fig. 1, function less efficiently than the circuit of Fig. 4.

In carrying out the present invention a series of acoustic impulses identical in character is produced to create a succession of sound fields in the formations adjacent a borehole. At each of a plurality of points spaced along the borehole the sound fields are sampled. In response to the onset of each sound field at a given point in the borehole there is initiated the production of a condition which changes in magnitude in a known manner as a function of time. The magnitude of the condition is then measured at the instant corresponding with the end of a predetermined number of acoustic oscillations of the sound field. The magnitude of the condition at each such instant is then registered in relation to the depth of each of the corresponding detecting points in the borehole.

Ordinarily it will be preferred to produce the sound field through the use of an acoustic transmitter which is always maintained a predetermined distance from the receiver thereby permitting variations in loading of the transmitter by the formations to find expression in the frequency content of the detected sound field. However, the coupling of the formations to the receiver itself may be made the primary variable by placing the sound source far from the points of reception. For example, charges of dynamite may be detonated at or near the mouth of the borehole with a receiver successively positioned at great depths in the borehole. Upon reception of the resultant signal at such depths the time required for a given number of acoustic oscillations may be measured.

Consistent with the primary object of the present invention to obtain a measurable parameter which is dependent upon the earth formations, it is highly desirable that energy traveling from the transmitter 11, Fig. 1, to receiver 12 through the borehole fluids does not materially influence the measurements. The velocity of sound through the formations in general is higher than the velocity of sound through the borehole fluids and thus discrimination on a time basis may be effective to prevent unwanted interference. The generation of control pulses such as pulses 71—74 will therefore be limited to the time interval following the generation of each acoustic pulse by transmitter 11 equal to the spacing between transmitter 11 and receiver 12 divided by the velocity of sound in the borehole fluids.

From the foregoing description it will be seen that the function 85, Fig. 2, is a linearly increasing voltage function. Similarly, the train of pulses generated in accordance with the above noted application Serial No. 370,376 is a linearly increasing function. Both such functions may be identified under a general designation as monotonic functions, that is functions which do not change sign of slope in a given time interval.

The foregoing description has related to the generation of control pulses 71—74 each of which is coincident with the zero incidence of an oscillation of the output from receiver 12. Alternatively, the frequency characteristics of the received signal may be logged by generating control pulses corresponding in time with the peaks and troughs of the received signal. Such peaks and troughs as well as the zero incidences for the purpose of the present description may be considered as transition points. Transition points of one character occur at the zero incidences where there is a transition from a positive to a negative voltage. Transition points of another character occur at peaks and troughs of the received signal where there is a transition from positive slope to negative slope or from negative slope to positive slope. By providing a suitable differentiating network prior to the clipping and full-wave rectification of the received signal, the control pulses may be produced corresponding with such transitions in slope.

While it has been shown how the method of the present invention may be practiced utilizing the illustrated systems, it is to be understood that other systems for carrying out the method will now suggest themselves to those skilled in the art and it is intended to cover such modifications as fall within the scope of the appended claim.

What is claimed is:

The method of logging earth formations penetrated by a borehole, which comprises generating a succession of time-separated oscillatory sound fields each having an abrupt onset, detecting at a plurality of points in the borehole said oscillatory sound fields, and registering on a space scale related to the depths of said points in said borehole magnitudes of conditions each proportional to the frequency of said oscillatory sound fields respectively detected at said spaced points.

References Cited in the file of this patent

UNITED STATES PATENTS

| | | |
|---|---|---|
| 2,200,476 | Mounce | May 14, 1940 |
| 2,651,027 | Vogel | Sept. 1, 1953 |
| 2,704,364 | Summers | Mar. 15, 1955 |